United States Patent [19]

Dickie

[11] Patent Number: 4,853,790
[45] Date of Patent: Aug. 1, 1989

[54] ELECTROMAGNETIC AND ELECTROSTATIC SHIELDING FOR ELECTRONIC EQUIPMENT

[76] Inventor: Robert G. Dickie, 15 Valley Trail, Rural Route #1, Newmarket, Ontario, Canada, L3Y 4V8

[21] Appl. No.: 190,371

[22] Filed: May 5, 1988

[51] Int. Cl.[4] .................... H04N 5/64; H04N 5/645
[52] U.S. Cl. ................................ 358/245; 358/254; 313/402; 313/479; 313/482; 174/35 GC; 174/35 R
[58] Field of Search .................... 358/245, 254; 220/2.1 A; 174/35 GC, 35 R; 361/424; 313/402, 479, 482, 313

[56] References Cited

U.S. PATENT DOCUMENTS

| | | | |
|---|---|---|---|
| 2,797,408 | 6/1957 | Penn et al. | 358/245 |
| 3,140,342 | 7/1964 | Ehrreich | 174/35 GC |
| 3,431,454 | 3/1969 | Sanders | 358/245 |
| 3,952,152 | 4/1976 | Lill | 358/245 |
| 4,246,613 | 1/1981 | Choder et al. | 358/245 |
| 4,247,737 | 1/1981 | Johnson | 174/35 GC |
| 4,381,421 | 4/1983 | Coats et al. | 174/35 R |
| 4,412,255 | 10/1983 | Kahlman et al. | 358/245 |
| 4,468,702 | 8/1984 | Jandrell | 358/245 |
| 4,514,585 | 4/1985 | Paynton | 174/35 GC |
| 4,551,765 | 11/1985 | Meeder | 358/245 |
| 4,556,821 | 12/1985 | Cooper | 358/245 |
| 4,621,294 | 11/1986 | Lee | 220/2.1 A |
| 4,633,322 | 12/1986 | Fourny | 358/254 |
| 4,646,159 | 2/1987 | Beaumont | 358/254 |
| 4,686,576 | 8/1987 | Dickie et al. | 358/245 |
| 4,692,809 | 9/1987 | Beining | 358/247 |
| 4,701,801 | 10/1987 | Hobbins | 358/245 |
| 4,710,591 | 12/1987 | Rochester | 358/245 |
| 4,795,941 | 1/1989 | Noda | 313/479 |

FOREIGN PATENT DOCUMENTS 2187893  9/1987  United Kingdom .............. 174/35 R

OTHER PUBLICATIONS

Conductive Gasket; French et al; vol. 17, No. 5; 10-74.
Gaskets That Block EMI; John Severinsen; vol. 47, No. 19; 8-75.
Shielding Prod. & Serv.; Primec Corp.; pp. 1-22.

Primary Examiner—James J. Groody
Assistant Examiner—Jerome Grant
Attorney, Agent, or Firm—Robert O. Nimtz

[57] ABSTRACT

A method and structure for assembling cathode ray tube electronic equipment is disclosed in which a sheet metal cage is assembled inside the plastic housing to enclose the electronic components. The face of the cathode ray tube is covered with a fine conductive mesh which is engaged by the bezel surrounding the front edges of the cathode ray tube. A projecting lip on the inner edge of the bezel, contoured to match the tube face, engages the mesh to keep it flat and smooth against the face of the tube. Simultaneously, flanges on the front of the cage are attached by self-tapping screws to bosses on the back side of the bezel so as to capture the edges of the mesh in conductive contact against the cage flanges. Conductive gaskets may be used to improve the electrical contact between the parts and thus improve the tightness of the shield. Internal shielding may also be provided by can-shaped shields affixed to the vertical walls of the cage and positioned so as to enclose components mounted on horizontal surfaces inside the cage. The decorative housing mates with the rear edge of the bezel and is attached to the rear of the cage by self-tapping screws. These piece parts may be selectively assembled into equipment cabinets with varied levels of shielding by using or omitting various shielding elements such as the mesh, the gaskets, the number of assembly screws or the various surfaces of the shielding cage.

5 Claims, 4 Drawing Sheets

ELECTROMAGNETIC AND ELECTROSTATIC SHIELDING FOR ELECTRONIC EQUIPMENT

TECHNICAL FIELD

This invention relates to shielding for electronic equipment and, more particularly, to electromagnetic and electrostatic shielding for various types of electronic equipment subject to unwanted electromagnetic energy leakage such as, for example, cathode ray tube display devices.

BACKGROUND OF THE INVENTION

It is well known that many types of electronic equipment tend to radiate electromagnetic energy when operated in the high frequency ranges. Such radiation is generally undesirable for several reasons. Information being processed by the electronic equipment, for example, might be compromised in a security sense by such unwanted radiation or leakage. Spurious radiation might interfere with or distort information being processed in nearby equipment. Federal Communications Commission (FCC) regulations on such spurious electromagnetic radiation might be violated. Finally, such radiation may be considered to be a health hazard. It is therefore common to provide shielding around such electronic equipment to avoid such unwanted radiation.

In the past, electronic equipment was typically housed in metallic cabinets which served as natural radiation barriers. More recently, however, housings for electronic equipment has tended to be plastic for economic and aesthetic purposes, but thereby aggravating the radiation leakage problem. In order to prevent unwanted radiation from electronic equipment, it is common to revert to the earlier equipment designs, completely enclosing the equipment in a metallic housing which, when connected to a common potential level, provides an electromagnetic and electrostatic shield against unwanted radiation. If the equipment includes a cathode ray tube, light emitting diodes (LEDs) or other types of display devices, the shielding enclosure must include a portion which is transparent to visible light while opaque to electromagnetic radiation in the microwave region. A finely woven conductive mesh stretched across the face of the display surface and intimately connected to the rest of the metallic enclosure has been used to provide a total shielding enclosure for such electronic equipment. Fabrication of such a mesh is shown in B. E. Kuhlman et al. U.S. Pat. No. 4,412,255, granted Oct. 25, 1983, and R. D. Paynton U.S. Pat. No. 4,514,585, granted Apr. 30, 1985. Providing such intimate electrical connection of the metallic mesh to the metallic enclosure has presented difficult and expensive fabrication problems which has tended to make such shielded enclosures considerably more expensive than the more common unshielded equipment. Some of these approaches are shown in J. Choder et al. U.S. Pat. No. 4,246,613, granted Jan. 20, 1981, W. D. Coats et al. U.S. Pat. No. 4,381,421, granted Apr. 26, 1983, L. H. M. Jandrell U.S. Pat. No. 4,468,702, granted Aug. 28, 1984, and R. R. Dickie et al. U.S. Pat. No. 4,686,576, granted Aug. 11, 1987.

A common technique for providing the metallic enclosure for electronic equipment housed in plastic cabinetry is to coat the inner surface of a plastic housing with a conductive layer by spraying, painting or electro-depositing such a layer. Providing such a metallic layer is expensive and of limited value due to the limited effectiveness of such coatings due to their limited conductivity, and the large number of orifices in such housings for circulating air for cooling and for connections to other equipment by way of cables passing through such orifices. Moreover, making a good continuous electrical connection to such a metallic coating is difficult and expensive.

As a result of these and other fabrication problems, it is common for manufacturers of such equipment to provide two or more totally different equipment enclosure designs for shielded and unshielded electronic equipment. The shielded designs tended to be considerable more bulky, expensive and less aesthetic in appearance than the comparable unshielded designs due to the severe fabrication constraints on such designs. As a result, the use of highly shielded designs for electronic equipment including display surfaces has been restricted to small segments of the market which could bear the added costs. Such market segments include the military market and the market for use in environments especially sensitive to electromagnetic radiation such as hospitals and laboratories.

SUMMARY OF THE INVENTION

In accordance with the illustrative embodiment of the present invention, these and other problems are solved by a shielding structure and fabrication process which provide total shielding to cathode ray tube equipment without significantly adding to the cost or fabrication complexity for such equipment. Rather than attempting to coat the inner surface of a plastic housing, a metal cage or enclosure is provided inside of the plastic housing which enclosure acts as a shield as well as a framework for attaching the plastic housing. The aesthetic appearance sought to be obtained by the housing design is thereby preserved while, at the same time, securing the advantages of complete electromagnetic and electrostatic shielding.

More particularly, the cage is constructed of generally U-shaped sheet metal walls for the sides and rear of the electronic equipment. Top and bottom sheet metal covers complete the enclosure on all sides except for the front from which the face of the cathode ray tube or other display surface must be viewed. Assembly of these parts is facilitated by metallic flanges on all mating edges which can be used for welding or bolting or otherwise attaching the piece parts together. For ultra-secure shielding, conductive compressible gaskets can be inserted between the mating metallic parts prior to assembly.

A conductive fine mesh of metal wires or metallized threads is used to complete the enclosure across the face of the cathode ray tube. Typically, such meshes are constructed from fine gauged wire or thread of a few thousandths of an inch in diameter arranged in a rectilinear pattern of between 80 and 120 wires per inch. In order to lower the cost and reduce the assembly complexity for the front of the enclosure, the conductive mesh is not laminated in glass or clear plastic, but is simply laid on the tube surface and a nonconductive plastic bezel used to both hold the mesh in tight and smooth contact with the face of the cathode ray tube and to force the periphery of the mesh in intimate conductive contact with a flange on the front edge of the sheet metal enclosure. The assembly step of bolting the bezel to the sheet metal enclosure therefore simultaneously holds the mesh in smooth, tight contact with the face of the tube and also holds the mesh in continuous conductive contact with the flange on the sheet metal enclosure.

An angled lip on the inner-facing edge of the nonconductive plastic bezel is contoured to rest tightly against the face of the cathode ray tube, thereby facilitating holding the wire mesh in tight, smooth contact with the face of the tube. A plurality of projecting bosses on the inside surface of the bezel serve as pedestals for threaded holes which can be used to secure the bezel to the front-facing flanges on the sheet metal enclosure. Ribs extending between the bosses may have U-shaped channel pieces inserted over the ribs to form smooth surfaces to force the wire mesh against the flanges and thus maintain the conductive enclosure continuous between the bosses. The function of the channel members is to exert a smooth continuous linear force against the mesh to insure continuous contact with the metallic flange. Conductive gaskets may be used between the sheet metal flange and the conductive mesh to improve the shielding characteristics.

The sheet metal sides of the shielding enclosure also provide a mounting surface for yet further types of shields for particular electronic devices. The fly-back transformer, for example, generates exceptionally high intensity magnetic spikes which not only cause radiation from the equipment, but can also cause interference with other electronic elements within the shielded enclosure. Such high intensity sources of radiation can best be shielded by a mu-metal enclosure surrounding the transformer. Rather than providing a mounting for this added enclosure on the transformer chassis, a simpler and less expensive technique is to mount the shielding enclosure on the sheet metal wall adjacent to the chassis on which the transformer is mounted. When the overall shielding enclosure is assembled, the mu-metal "can" can be so positioned on the adjacent wall as to fully enclose the transformer without actually touching either the transformer itself or the chassis on which the transformer is mounted. This technique further increases the effectiveness, and reduces the cost, of such additional shielding. Moreover, the shielding enclosure acts as a very efficient heat sink for the heat generated as the electromagnetic radiation is absorbed by the mu-metal. metal enclosure is mounted on the same chassis as the fly-back transformer itself.

Assembly is completed by inserting the shielded electronics inside a plastic housing which mates with the back edge of the bezel and which is fastened to the rear of the sheet metal enclosure by simple sheet metal screws. The assembled shielded cathode ray tube display cabinet can then be attached to a swivel base, computer terminal base, personal computer base, or any other application-dependent equipment.

It will be noted that various different levels of shielding can be achieved with substantially the same piece parts and at a vastly reduced cost over conventional shielding techniques. If the U-shaped side and rear walls are retained as necessary structural elements, then shielding can be improved in discrete steps by selectively adding the top cover, the bottom cover, the conductive mesh over the face of the tube, and the conductive gaskets between the mated parts of the enclosure. The number, and hence the spacing, of the self-tapping screws used in assembling the parts of the enclosure can also be varied to provide graded levels of shielding at the mating edges. The extra holes and bosses for receiving these self-tapping screws can be incorporated in the piece parts at substantially no additional cost, to be used only if warranted by the desired level of shielding. It is therefore possible to provide a single design for the electronic equipment and to incorporate the desired level of shielding by adding relatively inexpensive piece parts during assembly. Moreover, and of great marketing importance, the external appearance of the cabinet, provided by the housing and the bezel, are totally independent of the level of shielding incorporated in the finished product. Finally, the piece parts which must be manufactured and maintained in inventory for assembling and maintaining a complete line of equipment having various levels of shielding is kept at a minimum, hence reducing the cost of maintenance as well as the cost of assembling such equipment.

BRIEF DESCRIPTION OF THE DRAWINGS

A complete understanding of the present invention may be gained by considering the following detailed description in conjunction with the accompanying drawing, in which.

To facilitate reader understanding, identical reference numerals are used to designate elements common to the figures.

DETAILED DESCRIPTION

Figure 1:
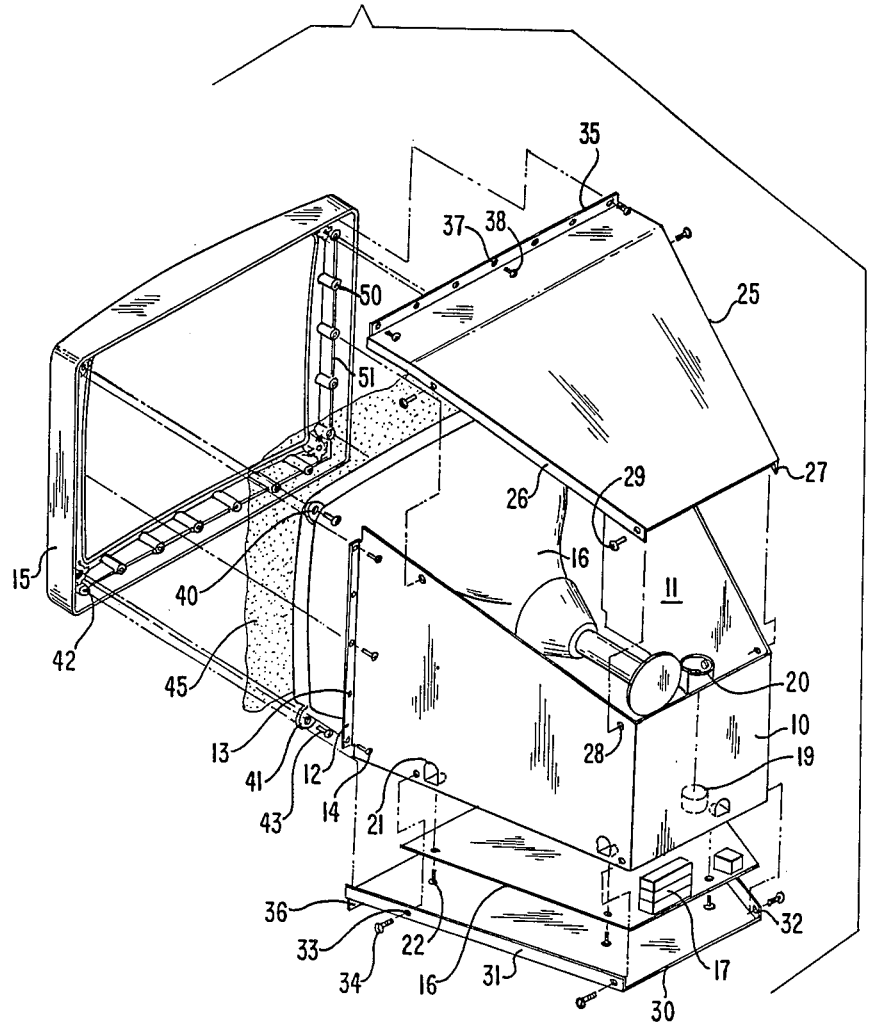
FIG. 1 shows a perspective, exploded view of a cathode ray tube electronic equipment package utilizing the electromagnetic and electrostatic shielding techniques of the present invention.

Referring more particularly to FIG. 1, there is shown a perspective exploded view of a cathode ray tube electronic equipment package using the shielding system of the present invention. FIG. 1 shows a U-shaped sheet metal member 10 which forms the side walls and the rear wall of a cage or enclosure 11 in which the electronic components are mounted. The member 10 has orthogonal flanges similar to flange 12 at the front edges thereof and having a plurality of holes 13 therein to receive self-tapping screws 14 for assembly of the member 10 to a nonconductive retaining frame or bezel 15, to be described hereinafter.

A baseplate or chassis 16 is provided for mounting electronic components, such as component 17, cathode ray tube 18, and fly-back transformer 19. A mu-metal shielding can 20 is affixed, by spot welding or self-tapping screw or other means, to the inside of one wall of member 10. Can 20 is so positioned on member 10 that when chassis 16 is attached to member 10, by way of tabs 21 and screws 22, can 20 fits over and completely shields fly-back transformer 19. In this way, the internal magnetic shielding for the fly-back transformer is provided without the necessity of providing mounting means on the transformer 19 or the chassis 16. This arrangement simplifies and reduces the cost of assembly of the unit.

A sheet metal top cover 25 is provided with side flanges 26 and 27 to be used to assemble cover 25 to member 10, using holes such as hole 28 and self-tapping screws such as screw 29. Similarly, a sheet metal bottom cover 30 is provided with side flanges 31 and 32 to be used to assemble cover 30 to member 10, using holes such as hole 33 and self-tapping screws such as screw 34. Both top cover 25 and bottom cover 30 have front flanges 35 and 36, respectively, for assembly to bezel 15, using holes such as hole 37 and self-tapping screws such as screw 38.

Cathode ray tube 18 includes tabs such as tabs 40 and 41 at the four corners of the tube face to serve as mounting means for the bezel 15 to the face of tube 18. For this purpose, bezel 15 has four major bosses such as boss 42 at the four inner corners to receive self-tapping screws such as screw 43 inserted through tab 41. A rectangular sheet 45 of conductive mesh material serves as an electromagnetic shield for the face of tube 18. Mesh 45 may comprise a fine gauge blackened metallic wire mesh of, for example, stainless steel, or a nonconductive mesh of fine threads the surface of which is thereafter made conductive by soaking, spraying or otherwise coating with conductive material. The metallic mesh is blackened by anodizing or painting to reduce reflections from the wires themselves which would interfere with viewing the display surface behind the mesh. Mesh 45 is sufficiently large to fully cover the face of tube 18 and to extend beyond the edges of the face of tube 18 to engage the cage 11 as will be described hereinafter.

A plurality of minor bosses such as boss 50 are disposed along all four sides of the inside of bezel 15. Bosses such as boss 50 are provided with holes into which the self-tapping screws such as screws 14 and 38 are threaded when the conductive cage formed by member 10 and covers 25 and 30 are assembled to bezel 15. Extending between adjacent pairs of minor bosses such as boss 50 are a plurality of reinforcing ribs such as rib 51. Ribs 51 serve to strengthen the bosses 50 and also serve as a retaining surface to retain mesh 45 against flanges 12 and 35 during and after assembly.

Figure 2:
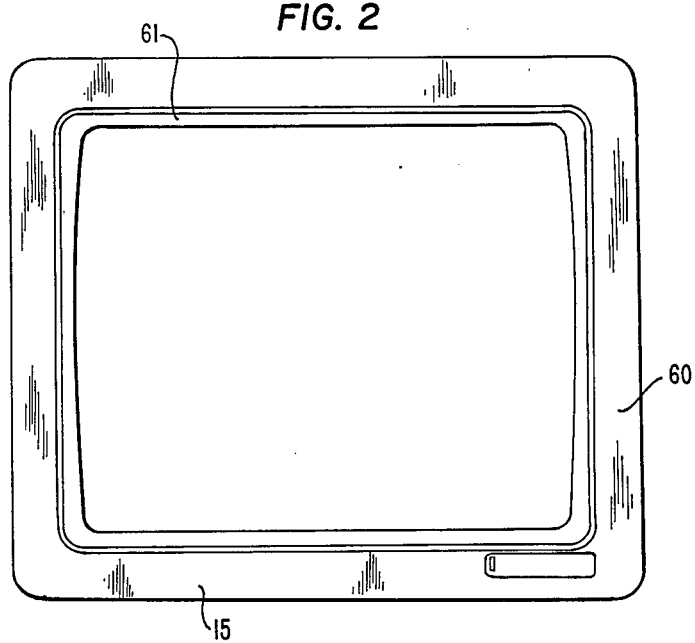
FIG. 2 shows a plan view of the front of the bezel used in the shielded enclosure depicted in FIG. 1.
Figure 3:
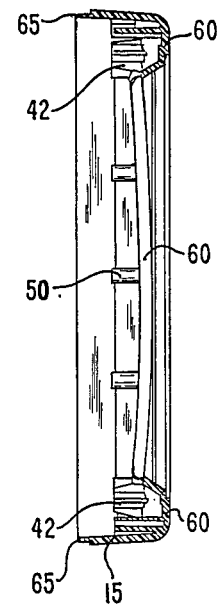
FIG. 3 shows a cross-sectional view of the bezel shown in FIG. 2.
Figure 4:
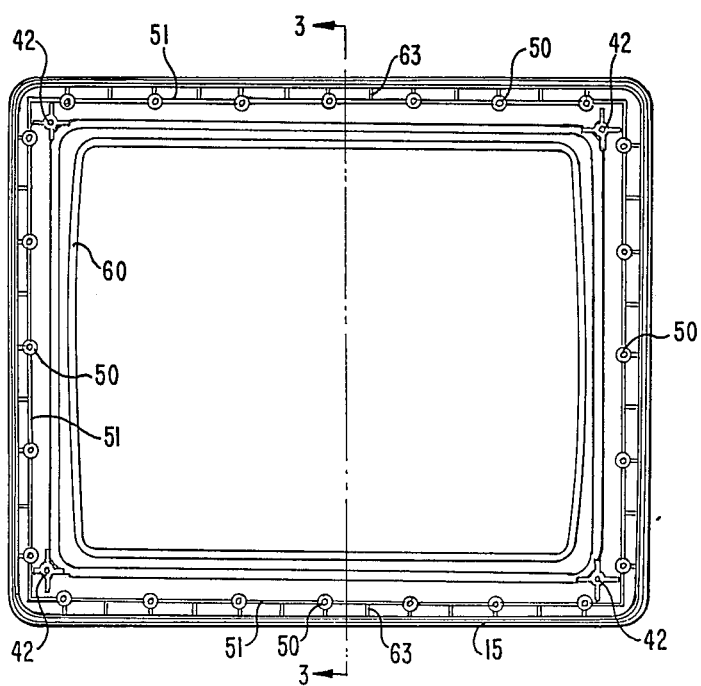
FIG. 4 shows a plan view of the rear of the bezel shown in FIG. 2.

The details of bezel 15 can be better seen in FIGS. 2, 3 and 4. FIG. 2, for example, shows a front view of bezel 15, while FIG. 3 is a vertical cross-sectional view of bezel 15 and FIG. 4 is a rear view of bezel 15. The front face of bezel 15 comprises an ornamental frame portion 60 which serves to frame the face of the cathode ray tube, and an inclined lip portion 61 the inner surface of which is contoured (as better shown in FIG. 3) to exactly fit the contour of the face of the cathode ray tube 18 (FIG. 1). Lip 61 serves to provide a tight closure to the face of the tube 18 after assembly, and also serves to hold the mesh 45 smoothly and tightly against the face of tube 18. As can best seen in FIG. 4, the major bosses 42 receive the self-tapping screws which hold the tabs 40 and 41 to the bezel 15, while minor bosses 50 receive the self-tapping screws which hold the conductive cage 10-25-30 to bezel 15. Ribs 51, strengthened by cross-ribs 63, serve to hold the mesh 45 against the flanges 12, 35 when the unit is assembled.

Not shown in FIG. 1 is a non-conductive plastic housing which fits over so as to contain the conductive cage 10-25-30. This housing 64 (shown in FIG. 6) mates into a setback 65 at the rear edges of bezel 15. The plastic housing can then be attached by self-tapping screws into the rear of member 10, thereby providing a decorative housing which plays no part in the electromagnetic shielding.

Returning to FIG. 1, the process of assembling the shielded electronic equipment cabinet in accordance with the present invention will now be described. The first step is to assemble the electronic components, such as components 17, 18 and 19 to chassis 16, and providing all of the intercomponent wiring required. Chassis 16 may, of course, comprise a printed wiring board with the intercomponent wiring already laid down as conductive paths on the board. The next step is to assemble chassis 16 to the U-shaped member 10, using self-tapping screws 22 through tabs 21. Tabs or brackets 21 may, of course, be bolted or welded to member 10 rather than comprising knock-out tabs as shown in FIG. 1.

The next step is to assemble top cover 25 and bottom cover 30 to member 10, using the self-tapping screws through the flanges at the mating edges. Alternatively, these portions of the cage 11 could be welded, spot welded or otherwise attached together. It is important, however, that the electromagnetic shield be preserved by insuring a tight intimate conductive contact between the parts of cage 11. The next step is to lay the conductive mesh 45 across the face of tube 18, making sure that the mesh is smooth against the face of tube 18 and extends evenly beyond the face of tube 18 on all four sides.

When the mesh 45 is smoothly laying against the face of tube 18, the bezel 15 is placed over the mesh 45 such that the lip 61 contacts and holds the mesh 45 tightly and smoothly against the face of tube 18. Self-tapping assembly screws 43 can then be inserted through tabs 40, 41, piercing through mesh 45 and engaging the self-tapping holes in major bosses 42 in bezel 15. Once bezel 15 is securely fastened to the face of tube 18, the forward-facing flanges 12, 37 of cage 11 can then be attached to bezel 15 by means of self-tapping screws 14, 38, inserted through flanges 12, 37, piercing mesh 45 and engaging self-tapping holes in minor bosses 50 of bezel 15. When the self-tapping screws are tightened, the ribs 51 hold the mesh 45 tightly against the flanges 12, 37 in the regions between the bosses 50. The ribs 51 insure a continuous intimate contact between the mesh 45 and the cage 11 to maintain the conductive integrity of the entire electromagnetic shield.

The final step in the assembly is to fit the decorative housing 64 (FIG. 6) around the cage 11 so as to engage the rearwardly extending step 65 (FIG. 3) of bezel 10. The decorative housing 64 can then be attached to the cage 11 by self-tapping screws through the housing 64 and into the walls of cage 11. Since this housing provides none of the structural support for the electronic equipment, only a few screws in the rear of the housing are sufficient to hold the housing in place.

Figure 5:
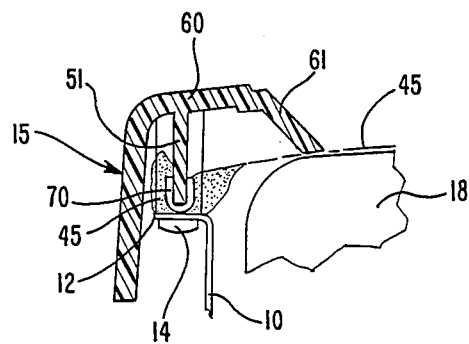
FIG. 5 shows a detailed cross-sectional view of the mating of the bezel, sheet metal enclosure, cathode ray tube and conductive mesh shown in exploded form in FIG. 1.

The details of the assembly of the equipment along the edges of the bezel 10 are shown in an enlarge cross-section in FIG. 5. Thus, in FIG. 5, the bezel 15 has a lip 61 which bears against the mesh 45 which, in turn, rests on the face of cathode ray tube 18. Lip 61 holds mesh 45 in place tightly and smoothly after assembly. Self-tapping screw 14 is threaded through flange 12 of U-shaped member 10, and through mesh 45 into a self-tapping hole in boss 50. The rib 51, extending between bosses 50, hold mesh 45 in intimate contact with flange 12 on member 10. In order to improve this contact, a conductive, U-shaped channel member 70 can be laid over ribs 51 to aid in maintaining this intimate contact. Indeed, channel members 70 can be constructed of compressible conductive material which serves as a conductive cushion to hold mesh 45 against flange 12.

Figure 6:
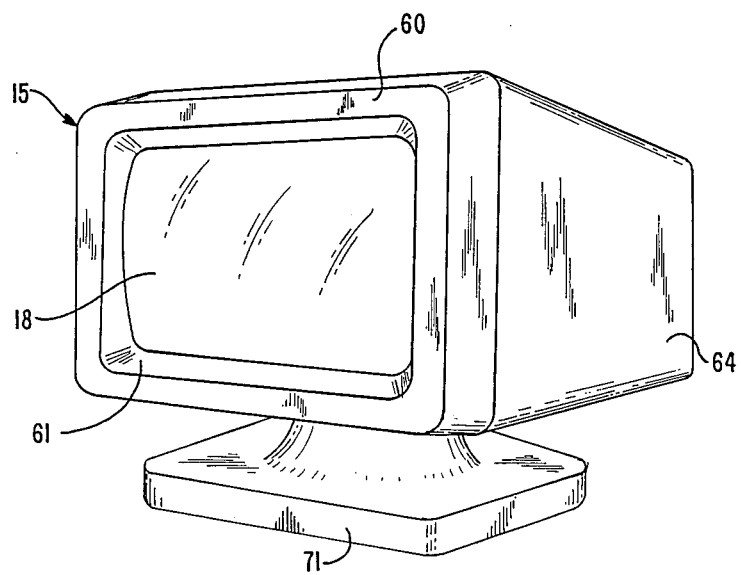
FIG. 6 shows a perspective view of a completely assembled cathode ray tube monitor in accordance with the present invention.

In FIG. 6 there is shown a perspective view of a fully assembled cathode ray tube monitor constructed in accordance with the present invention. As can be seen in FIG. 6, the cabinet can be mounted on a pedestal 71 which permits the cabinet to be swiveled in any direction. Alternatively, the cabinet can be mounted directly on top of another cabinet containing yet other electronic components such as a personal computer processor.

It can be seen that the method and apparatus in accordance with the present invention provide a complete electromagnetic and electrostatic shield around the electronic components mounted inside of cage 11. The parts necessary to accomplish such a shielded enclosure are relatively inexpensive parts which require no complicated assembly jigs or procedures. The external appearance of the assembled electronic cabinet, as shown in FIG. 6, is totally independent of the shielding and can be designed to provide a pleasing appearance which carries out common decorative elements of a family design for a number of related electronic cabinets containing differing components.

Figure 7:
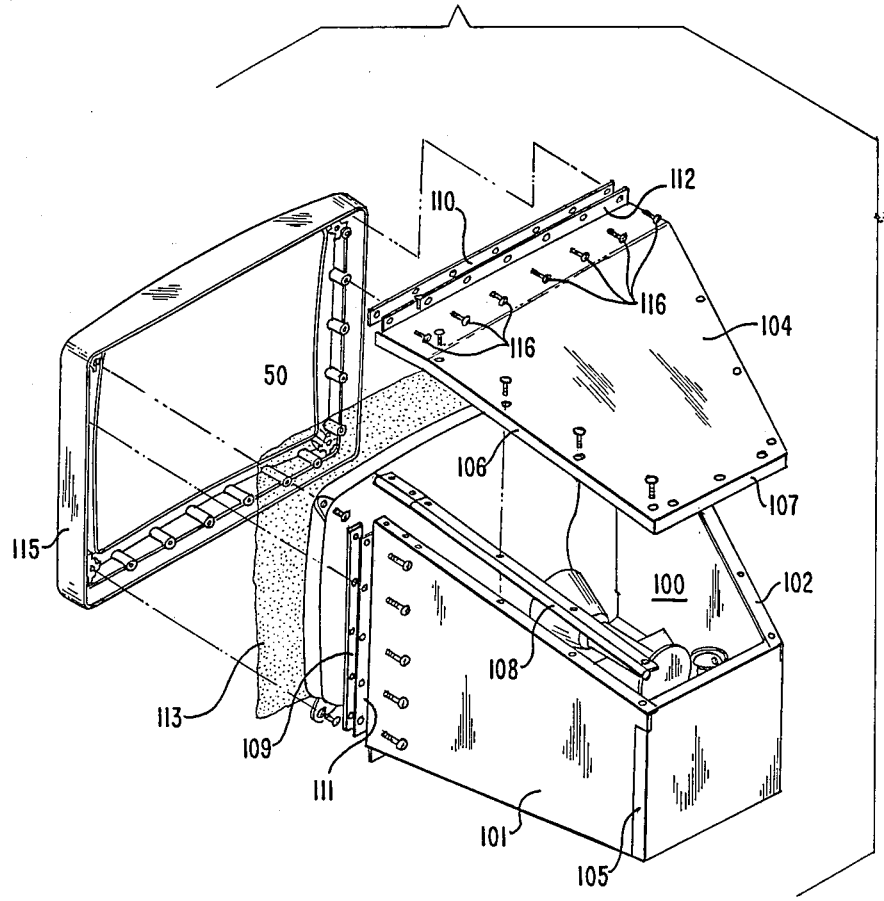
FIG. 7 shows a perspective exploded view of another embodiment of the present invention showing the use of conductive gaskets at the mating surfaces of the shielding enclosure.

The level of the shielding provided by the apparatus and assembly procedures described in connection with FIGS. 1 through 6 can be varied simply by adding or substituting piece parts. Not all applications require the same level of shielding. Military applications, for example, require a much higher level of shielding for security reasons than do applications in radiation-sensitive environment. Moreover, both of these applications require more shielding than is required simply to meet the FCC regulations concerning spurious radiations from electronic equipment. It is therefore possible to fabricate a line of equipment cabinets that perform the same overall function, but which meet the requirements for a plurality of different shielding levels, all in identically appearing cabinets. FIG. 7 shows an exploded view of a cathode ray tube equipment cabinet shielded enclosure which provides a higher level of shielding than that depicted in FIG. 1, but which uses the same or easily substituted piece parts during assembly.

Referring then to FIG. 7, there is shown an exploded perspective view of a cathode ray tube enclosure 100 comprising conductive side walls 101 and 102, rear wall 103, top cover 104 and a bottom cover, not shown in FIG. 7. Orthogonal flanges 105, 106, 107, . . . are provided at all mating edges of members 101-104. Conductive gaskets such as conductive gasket 108, are inserted between the mating flanges on members 101-104 when they are assembled together to improve the intimacy of the conductive connection between these members and to insure that no openings remain which could permit radiation leakage. Similarly, conductive gaskets 109 and 110 are provided between front-facing flanges 111 and 112, respectively, and mesh 113 to improve the continuity and intimacy of the electrical contact. It will also be noted in connection with FIG. 7 that the inner chassis holding the electronic components, while not shown in FIG. 7, is not attached by punch-out tabs similar to tabs 21 in FIG. 1 to wall 101. The punch-out hole of FIG. 1 may itself permit radiation leakage at a level not permissible in the design of FIG. 7.

It will be noted that the bezel 115 in FIG. 7 has the same number of minor bosses 50 as does the bezel 15 of FIG. 1. A larger number of self-tapping screws 116 are provided in FIG. 7 to attach the cage 100 to bezel 115 than are provided in FIG. 1. Since the assembly screws are closer together and more numerous in FIG. 7, the intimacy of the conductive contact with the mesh 113 will be tighter and more continuous, thereby improving the shielding. Finally, some mesh materials provide a better shielding than others, albeit at a higher cost. A stainless steel mesh, for example, provides a better shield than a metallized fabric mesh.

It can be seen that the shielding system according to the present invention provides various levels of shielding using the same overall design, the same overall assembly procedures and generally the same overall piece parts. The variation in shielding level is obtained by varying the quality of the fully substitutable piece parts, the number of parts used or by adding parts to improve the shielding. In all cases, however, the major parts are identical and hence can be manufactured and stocked in only one form for an entire line of shielded cabinets with different levels of shielding. For example, the fully assembled chassis 16 can be identical regardless of the level of shielding. Similarly, the bezels 15, 115, the cathode ray tubes and the major sheet metal walls of the shielding cages. Shielding level can be varied by such minor piece parts as more assembly screws, a higher quality conductive mesh and the use of conductive gaskets between mating conductive parts. Most importantly, the unattractive appearance that normally accompanies high levels of shielding is avoided by keeping all shielding elements inside of the decorative housing. Finally, cabinets with different levels of shielding can be assembled on the same assembly line, using easily substitutable piece parts and easily learned variations in assembly procedures. The fabrication cost of such variably shielded cabinets is therefore vastly reduced over more conventional use of different designs for different shielding levels.

It should also be clear to those skilled in the art that further embodiments of the present invention may be made by those skilled in the art without departing from the teachings of the present invention.

What is claimed is:

1. A shielded electronic equipment cabinet comprising
   a sheet metal cage enclosing all of the electronic equipment in said cabinet except for one face thereof,
   a conductive mesh for enclosing said one face,
   a nonconductive bezel having an inner-facing lip contoured to match said one face such that, when assembled to said cabinet, said mesh is in position on said one face,
   said bezel also including a plurality of bosses for engaging fastening members which, when assembled, secure said cage and said mesh in intimate conductive contact with each other, and
   said bezel also including a stepped setback on its rear edge for engaging a nonconductive housing surrounding said cage and attached to said cage.

2. The equipment cabinet according to claim 1 further comprising
   raised ribs extending between said bosses to both strengthen said bosses and to assist in providing said intimate conductive contact between said bosses, and a plurality of channel-shaped conductive members disposed over said ribs to provide a smooth contact surface for conductively engaging said mesh essentially continuously around said one face.

3. The equipment cabinet according to claim 1 further comprising
a cylinder of shielding material closed at one end, attached to one wall of said cage, and positioned to enclose at least one electronic component attached to a substantially orthogonal wall of said cage when said cage is assembled.

4. A method of assembling a shielded electronic cabinet including a cathode ray tube comprising the steps of
mounting all electronic components including said cathode ray tube on a chassis,
surrounding said chassis on all sides except the face of said cathode ray tube by a conductive cage,
placing a conductive mesh on the face of said cathode ray tube,
holding said mesh in position on the face of said cathode ray tube with a nonconductive bezel contoured to mate with said face,
assembling said cage to said bezel so as to capture said mesh in intimate conductive contact between said bezel and said cage, and
placing a non-conductive housing around said cage to engage said bezel.

5. The method according to claim 4 further including the step of
inserting a conductive gasket between said cage an said mesh prior to assembly of said cage to said bezel.

* * * * *